United States Patent [19]
Kawashima et al.

[11] Patent Number: 5,434,485
[45] Date of Patent: Jul. 18, 1995

[54] FOCUS CIRCUIT

[75] Inventors: Masahiro Kawashima, Takatsuki; Yutaka Tsutsumi, Neyagawa, both of Japan

[73] Assignee: Matsushita Electric Industrial Co., Ltd., Osaka, Japan

[21] Appl. No.: 167,383

[22] Filed: Dec. 15, 1993

[51] Int. Cl.$^6$ ............................................. H01J 29/58
[52] U.S. Cl. .................................. 315/382.1; 315/411; 363/21
[58] Field of Search ...................... 315/382, 382.1, 411; 348/806, 372; 363/21

[56] References Cited

U.S. PATENT DOCUMENTS

| | | | |
|---|---|---|---|
| 4,642,744 | 2/1987 | Thomas | 363/21 |
| 4,835,668 | 5/1989 | Palm et al. | 363/21 |

FOREIGN PATENT DOCUMENTS 5796563  6/1982  Japan .

*Primary Examiner*—Theodore M. Blum
*Attorney, Agent, or Firm*—Panitch Schwarze Jacobs & Nadel

[57] ABSTRACT

In a focus circuit for cathode-ray tube (40) of electromagnetic focusing type, a DC voltage (B4) which is made by dividing CRT anode voltage (B3) by a voltage dividing circuit (27) is compared with a reference voltage (B6) by an anode voltage variation component detection circuit (29), thereby to output therefrom a signal (Ve) of anode voltage variation component. This signal (Ve) and static focus adjusting DC voltage (B7) are summed and amplified by an output amplifier 30, which issues a current for correcting focus to electromagnetic focusing coil (31).

3 Claims, 3 Drawing Sheets

FOCUS CIRCUIT

FIELD OF THE INVENTION AND RELATED ART STATEMENT

1. FIELD OF THE INVENTION

The present invention relates to a focus circuit of a video display apparatus using a cathode-ray tube of electromagnetic focusing type.

2. DESCRIPTION OF THE RELATED ART

In recent years, concerning video display apparatus using a cathode-ray tube, the market as the display apparatus of the text information or the picture information for high-definition video sources or computers is expanding. Accordingly, the improvement of its focusing performance is demanded on a point of achieving a high-definition picture quality over the whole regions of screen.

In particular, for the projection type apparatus, picture on the fluorescent screen of a cathode-ray tube (hereinafter, abbreviated as CRT) is projected in expanded scale on a projection screen. Therefore, the picture focusing performance over the whole regions of the fluorescent screen face is its most important characteristic. And in this case, the current density of the electron beam to be impressed to the fluorescent screen is very large, the electromagnetic focusing is suitable for obtaining good focusing characteristic.

In the following, referring to FIG. 1 showing a conventional focus circuit for electromagnetic focus type CRT, explanation is given on a high-voltage circuit for the anode of a CRT, which gives a substantial influence on the focus circuit and the focusing characteristics.

As is shown in FIG. 1(a) and FIG. 1(b), a CRT high-voltage circuit 1 and a focus circuit 10 are configured separately in the prior art. First, as shown in FIG. 1(b), the focus circuit 10 is configured such that a DC voltage B7 for static focusing adjustment is inputted into an input terminal of an output amplifier 11, thereby to flow a constant current through an electromagnetic focusing coil 12.

The high-voltage circuit 1 for the anode of the CRT is configured as follows. A DC voltage B1 is adjusted to B2 through an input voltage adjusting circuit 2. The current of the adjusted voltage is applied to a primary winding N1 of a fly-back transformer 3, being switched by a switching circuit 4. The switching circuit 4 is connected in series to this primary winding N1 and is controlled to be periodically interrupted by a horizontal pulses Hp, which are applied to an input terminal Hp of the switching circuit 4. The interruption of the current flowing in the primary winding N1 induces an AC high voltage in a secondary winding N2 of the fly-back transformer 3, and the induced AC high voltage is rectified and smoothed by a rectifying circuit consisting of a diode 5 and a capacitor 6 to produces a DC high voltage B3 as the output. And this DC high voltage B3 is applied to the anode 7 of the CRT and also to an output voltage dividing circuit 8.

The DC high voltage B3 is divided by the output voltage dividing circuit 8. Then, the divided voltage B4 is compared with & reference voltage B5 by & high-voltage stabilizing control circuit 9. The output of this circuit 9 is applied to and controls the input voltage adjusting circuit 2. In the input adjusting circuit 2, the DC input voltage B2 which is the input of the fly-back transformer 3 is controlled. Thus the DC high voltage B3, which is the voltage of the CRT anode voltage, is stabilized.

However, in the circuit of the prior art described above, since the focus circuit section 10 and the high-voltage circuit section 1 for the anode of the CRT are constituted separately without interrelation in between, there are the following problems.

First, although an amount of DC current to flow through the electromagnetic focusing coil 12 of the focus circuit section 10 should be determined depending on the anode voltage of the CRT, the conventional high-voltage circuit part 1 fails to have the capability of stabilizing the anode voltage of the CRT against its dynamic load variation because of its limited response characteristic. Consequently, there exists a transient variations in the anode voltage of the CRT, hence deviations of the DC current in the electromagnetic focusing coil 12 from optimum value.

In more detailed explanation, focal distances of $f_i$ and $f_o$ of an electromagnetic lens produced by the action of the electromagnetic focusing coil are expressed by $$\frac{1}{f_1} = \frac{-1}{f_o} = \frac{0.022}{V} \cdot \int_{z_o}^{z_i} \{B_o(z)\}^2 \, dz, \, [\text{cm}^{-1}] \qquad (1)$$

where, $f_i$ is the image side focal distance, $f_o$ is, the object side focal distance, and $z_o$ and $z_i$ are integration limits on the center axis.

That is, focal distances are determined by the potential V of the space wherein the electromagnetic lens is produced and by the magnetic flux density $B_0(z)$ along the center axis of the electromagnetic lens.

Hereupon, the magnetic flux density $B_0(z)$ along the center axis of the electromagnetic lens does not vary, because the DC current flowing through the electromagnetic focusing coil 12 is constant.

However, the CRT high-voltage circuit cannot stabilize the DC high voltage output completely, because its stabilization response characteristic is limited. Therefore, the potential V of the space for the electromagnetic lens action varies responding to the dynamic load variations of the high-voltage circuit. That is, the potential V varies responding to the variation of the anode voltage. As a result, the focal distances fi and $f_o$ of an electromagnetic lens, hence the focus state of picture image on the CRT screen also varies, thereby deteriorating the picture quality.

OBJECT AND SUMMARY OF THE INVENTION

The object of the present invention is to provide a focus circuit for a CRT of electromagnetic focusing type capable of affording an optimum stable focus state even when a high voltage circuit for the CRT anode makes a voltage fluctuation. Thereby, a very accurate fine image on the CRT, hence a video display apparatus using it are realizable, irrespective of the voltage fluctuation.

In the focus circuit of the present invention, in addition to the static focus correction of the electromagnetic focusing for a CRT electron beam, there are provided means for detecting the voltage variation of the high-voltage circuit for the anode of the CRT and means for fine-adjustment of the electromagnetic focusing of the electron beam of a CRT, by utilizing the voltage variation component. And thereby, it becomes possible to eliminate variations and deteriorations of picture image focus on the CRT screen, even when a voltage variations are present in the high-voltage circuit for the anode of the CRT. Therefore, a more optimized focus correction becomes achievable.

In order to achieve the above-mentioned object of the invention, the focus circuit in accordance with the present invention comprises:

a cathode-ray tube with electromagnetic focusing means, a focus circuit having means for detecting the voltage variations of a high-voltage circuit for the anode of the cathode-ray tube, and means which, basing on the voltage variations, makes fine-adjustment of the electromagnetic focus of electron beam in the cathode-ray tube.

Furthermore, the focus circuit in accordance with the present invention comprises:

a fly-back transformer for generating an AC high voltage from its secondary side, a rectifier for rectifying the AC high voltage into a DC high voltage for applying to the anode of a cathode-ray tube, an output voltage dividing circuit for dividing the high voltage to be supplied to the anode, a high-voltage stabilizing circuit for controlling to stabilize the input voltage of the primary side of the fly-back transformer by comparing the voltage from the output voltage dividing circuit with a first reference voltage, an anode voltage variation component detection circuit for detecting variation component of the voltage to be supplied to the anode through comparison of the voltage from the output voltage dividing circuit with a second reference voltage thereby to issue an output signal of anode voltage variation component, and an output circuit for supplying a current for correcting focus to a focus coil of the cathode-ray tube based on the output signal of the anode voltage variation component detection circuit.

According to the focusing apparatus of the present invention, besides the static focus correction of the electromagnetic focusing by applying a stabilized high voltage DC to the anode of CRT, a dynamic focus correction is performed by substantially superposing a component of focusing correction on a static focusing current, and flowing the superposed sum current to the electromagnetic focusing coil. This is realized by providing, in addition to the static focus stabilization circuit for a CRT electron beam, means for performing an optimization of dynamic focus correction by detecting the voltage variation component of the high-voltage circuit for the CRT anode and by making a fine-adjustment of the electromagnetic focusing of the CRT electron beam by utilizing voltage variation components. Thereby, it is possible to realize the focus correction in which no variation nor deterioration in the state of the focus of picture image on the CRT screen takes place, even when voltage variations are present in the anode high-voltage circuit of the CRT. Thereby the electromagnetic focus for the electron beam of the CRT is always kept to its optimum state, and subsequently a high-definite video picture can be realized.

DESCRIPTION OF THE PREFERRED EMBODIMENT

Figure 1A:
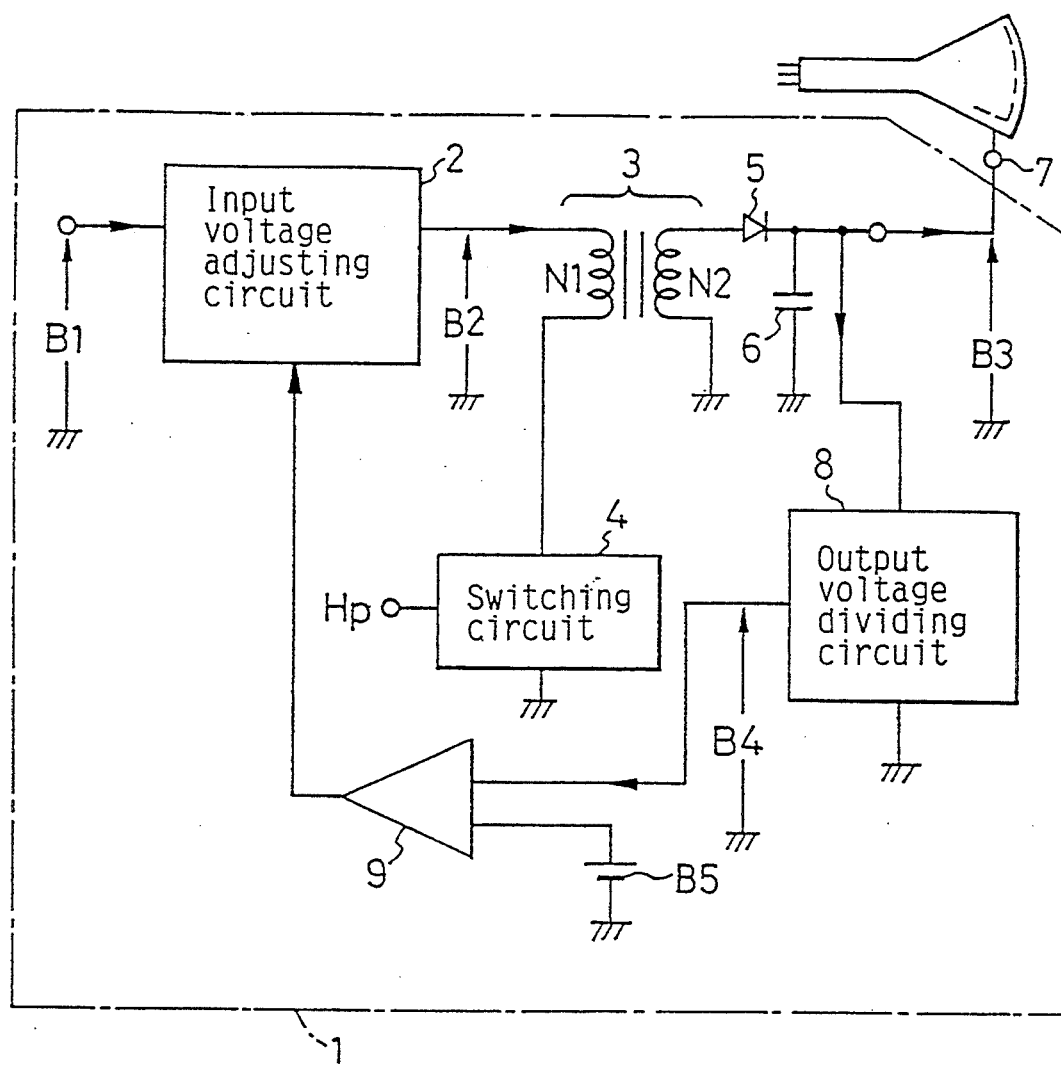
FIG. 1(a) is a block diagram of a CRT high-voltage circuit part of prior art.
Figure 1B:
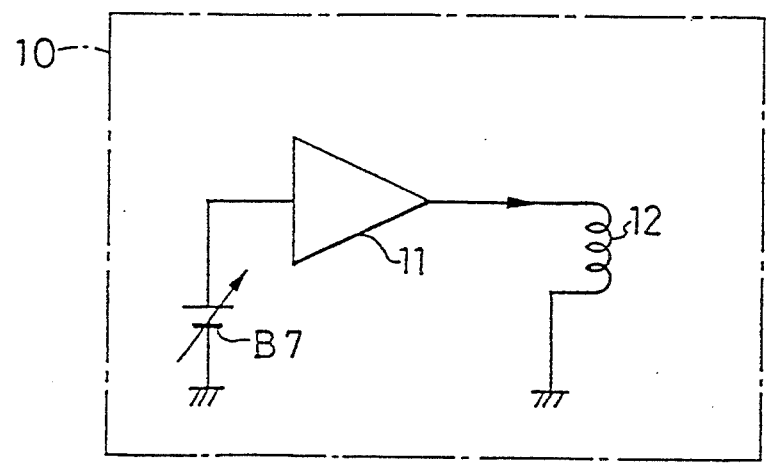
FIG. 1(b) is a block diagram of a focus circuit part of prior art.
Figure 2:
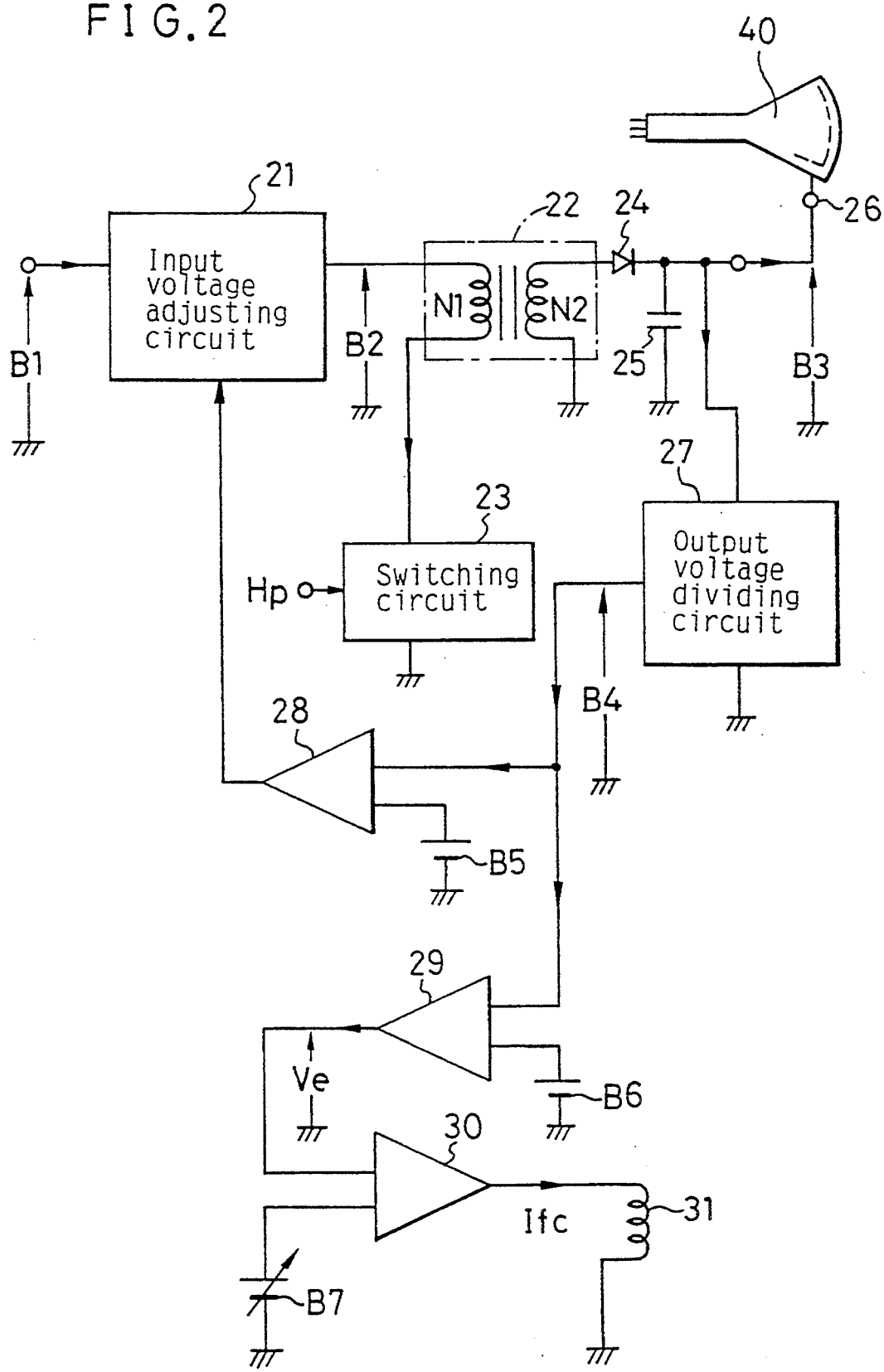
FIG. 2 is a block diagram of a focus circuit of a working example of the present invention.

In the following, explanation is given in detail on a working example of the present invention referring to FIG. 2. As is shown in FIG. 2, a DC voltage B1 is adjusted to B2 through an input voltage adjusting circuit 21 and applied to a primary winding N1 of a fly-back transformer 22, and is switched (i.e. periodically interrupted) by a switching circuit 23 connected in series to this primary winding N1 and controlled by horizontal pulses Hp which are applied to an input terminal Hp of the switching circuit 23. This interruption of the current flowing in the primary winding N1 induces an AC high voltage in a secondary winding N2 of the fly-back transformer 22. This induced high voltage is rectified and smoothed by a rectifying circuit consisting of a diode 24 and a capacitor 25 to produce a DC high voltage B3, which is issued as the output. And this DC high voltage B3 is applied to the anode 26 of the CRT 40 and also to an output voltage dividing circuit 27.

The high voltage B3 is divided by the output voltage dividing circuit 27 to produce a divided voltage B4. Then the divided voltage B4 is compared with a first reference voltage B5 by a high-voltage stabilizing control circuit 28. The output of this circuit 28 is applied to and controls the input voltage adjusting circuit 21, and there the DC input voltage B2 which is the input of the fly-back transformer 22 is controlled. Thus the DC high voltage B3, which is the voltage of the CRT anode voltage, is stabilized.

On the other hand, the DC voltage B4 which is divided by the voltage dividing circuit 27 is compared with a third reference voltage B6 by an anode voltage variation component detection circuit 29, which outputs a signal Ve of anode voltage variation component. The signal of anode voltage variation component Ve and a DC voltage B7 for static focus adjustment are inputted to an output amplifier 30, which composes these two inputs therein and outputs a focus current $I_{fc}$ which is corresponding to the sum of the DC voltage B7 for static focus adjustment and the anode voltage variation component Ve. The DC voltage B7 for static focus adjustment is an adjustable constant DC voltage, and is for fine static focus adjustment. The waveform of the focus current $I_{fc}$ flowing in the focusing coil 31 connected to the output amplifier 30 is substantially the same as that of sum voltage of the DC voltage B7 and the anode variation component Ve.

Figure 3:
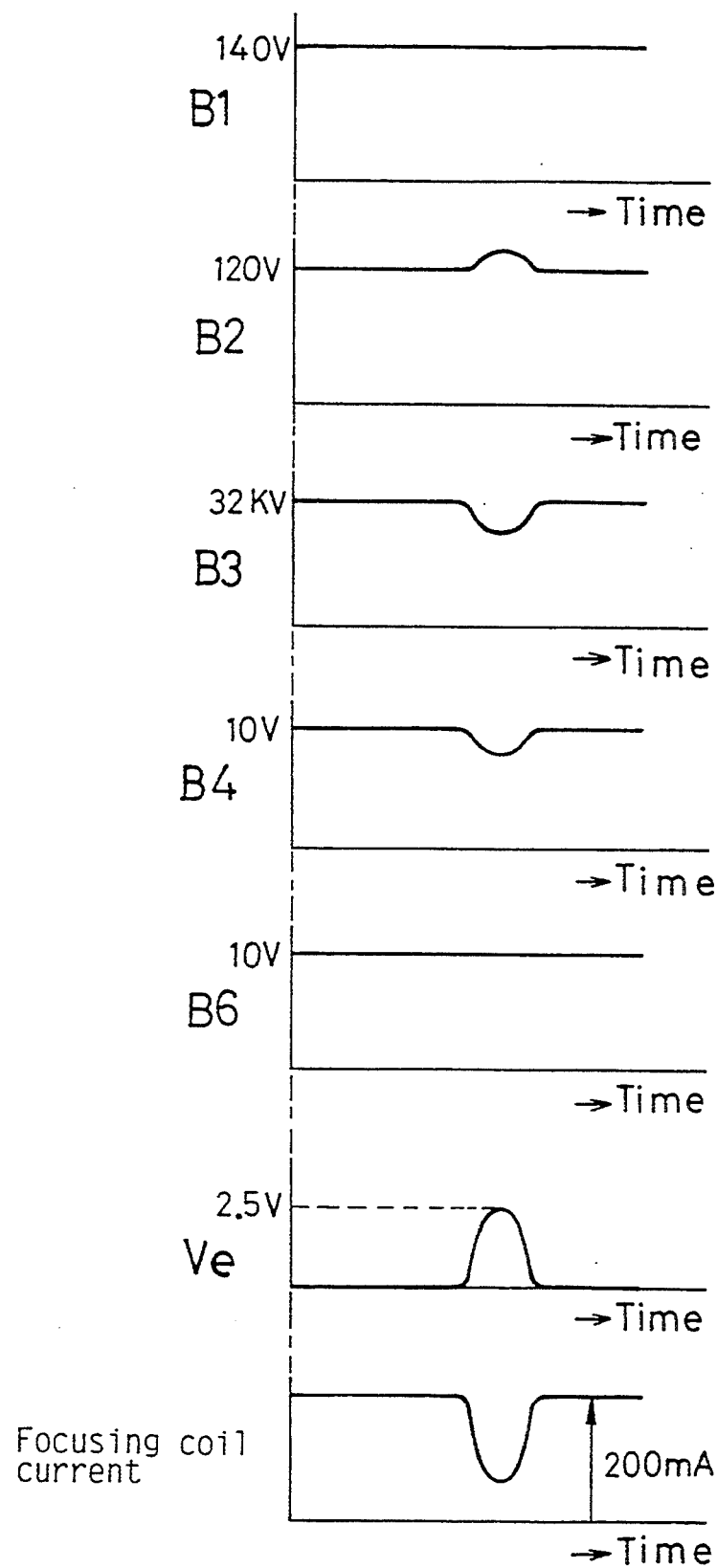
FIG. 3 is a chart of voltage waveforms at principal parts of FIG. 2 and focus correction current waveform of the principal part of FIG. 2.

In FIG. 3, voltage waveforms at the principal parts of FIG. 2 and the current waveform of the focus correction current $I_{fc}$ flowing through the focus coil 31 are shown. As is shown by waveforms of FIG. 3, at the CRT anode, when the DC high voltage B3 from the high-voltage circuit 22+23+24+25 drops, the DC high voltage B2 which is the voltage input to the fly-back transformer 22 is adjusted so as to be raised by the action of the input voltage adjusting circuit 21. At the same time, the variations in the DC high voltage B3 applied to the anode of this CRT 40 is detected by the anode voltage variation component detection circuit 29. In this period of high voltage load variation, as a result of rise of the voltage Ve, the current $I_{fc}$ of the focus coil 31 is lowered. Thereby, the focusing magnetic flux for the CRT 40 is decreased, and the electromagnetic focusing for the electron beam of the CRT 40 is adjusted to its optimum state.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A focus circuit comprising:
   a fly-back transformer for generating an AC high voltage from a secondary side thereof,
   a rectifier for rectifying said AC high voltage into a DC high anode voltage for being applied to an anode of a cathode-ray tube,
   an output voltage dividing circuit for dividing said anode voltage to produce a divided voltage,
   a high-voltage stabilizing circuit for controlling an input voltage applied to a primary side of said fly-back transformer by comparing the divided voltage from said output voltage dividing circuit with a first reference voltage,
   an anode voltage variation component detection circuit for detecting a variation of the anode voltage through a comparison of the dividing voltage from said output voltage dividing circuit with a second reference voltage to issue an output signal representative of the anode voltage variation, and
   an output circuit for supplying a focus correcting current to a focus coil of the cathode-ray tube, the focus current being varied by the output circuit in the same polarity and at a predetermined ratio as compared to the anode voltage variation to match the anode voltage variation.

2. A focus circuit in accordance with claim 1 wherein said focus correcting current corresponds to a sum of the output signal representative of the anode voltage variation and a DC voltage for static focus adjustment to the focus coil.

3. A focus circuit in accordance with claim 1 wherein the focus correcting current corresponds to a sum of a first current component corresponding to a voltage set in accordance with the anode voltage and a second current component corresponding to a voltage varied in accordance with the anode voltage variation.

* * * * *